(12) United States Patent
Abrams et al.

(10) Patent No.: US 7,118,070 B2
(45) Date of Patent: Oct. 10, 2006

(54) COMPOSITE SEAL AND WINDOW ASSEMBLY

(75) Inventors: Mark D. Abrams, La Crescenta, CA (US); Robert M. Smith, Cheltenham (GB)

(73) Assignee: Sierracin Corporation, Sylmar, CA (US)

( * ) Notice: Subject to any disclaimer, the term of this patent is extended or adjusted under 35 U.S.C. 154(b) by 0 days.

(21) Appl. No.: 10/898,403

(22) Filed: Jul. 23, 2004

(65) Prior Publication Data

US 2005/0103942 A1    May 19, 2005

Related U.S. Application Data

(60) Provisional application No. 60/489,420, filed on Jul. 23, 2003.

(51) Int. Cl.
B64C 1/14 (2006.01)

(52) U.S. Cl. .................... 244/129.3; 244/131

(58) Field of Classification Search ............... 244/121, 244/129.3; 52/309.3, 305, 200, 786.12, 204.593, 52/208; 296/201
See application file for complete search history.

(56) References Cited

U.S. PATENT DOCUMENTS

| | | | | |
|---|---|---|---|---|
| 2,258,724 A | * | 10/1941 | Wagner et al. | 52/200 |
| 2,409,808 A | * | 10/1946 | Sowle | 52/309.3 |
| 2,511,168 A | * | 6/1950 | Martin et al. | 428/38 |
| 2,576,392 A | * | 11/1951 | Downes | 52/208 |
| 2,808,355 A | * | 10/1957 | Christie et al. | 52/208 |
| 3,553,917 A | | 1/1971 | Gilman | |
| 4,004,388 A | * | 1/1977 | Stefanik | 52/204.593 |
| 4,611,850 A | * | 9/1986 | Fujikawa | 296/201 |
| 4,699,335 A | * | 10/1987 | DeOms et al. | 244/129.3 |
| 5,277,384 A | * | 1/1994 | Webb | 244/129.3 |
| 6,210,763 B1 | | 4/2001 | Katoh et al. | |
| 6,273,983 B1 | | 8/2001 | Miyakawa et al. | |
| 6,430,894 B1 | | 8/2002 | Chae et al. | |
| 6,477,812 B1 | | 11/2002 | Boone et al. | |
| 2002/0184840 A1 | | 12/2002 | Farrar et al. | |

FOREIGN PATENT DOCUMENTS

| | | |
|---|---|---|
| DE | 3202772 A1 | 8/1983 |
| DE | 3818605 C1 | 11/1989 |
| GB | 620559 | 3/1949 |

* cited by examiner

*Primary Examiner*—Galen Barefoot
(74) *Attorney, Agent, or Firm*—Christie, Parker & Hale, LLP

(57) ABSTRACT

A window assembly incorporating a composite seal is provided. The composite seal has a first sealing member and a second member stiffer than the first sealing member.

25 Claims, 6 Drawing Sheets

COMPOSITE SEAL AND WINDOW ASSEMBLY

CROSS-REFERENCE TO RELATED APPLICATION

This application is based upon and claims priority on U.S. Provisional Application No. 60/489,420 filed on Jul. 23, 2003, the contents of which are fully incorporated herein by reference. This application is also related to Application No. 10/897,469, entitled "Composite Seal" and filed on the same date as this application. This related application also claims priority on U.S. Provisional Application No. 60/489,420 filed on Jul. 23, 2003.

BACKGROUND OF THE INVENTION

This invention is directed to a window assembly incorporating a seal and more specifically a composite seal and to a method for forming such an assembly.

A window, such as an aircraft type of window is mounted on a frame 8 which is part of the structure of the vehicle. As shown in FIG. 1, an exemplary aircraft window (i.e., window transparency) 10 is a laminate structure and includes one or more main plies 12 which are typically made out of a polycarbonate, acrylic or glass. An interlayer 14 typically made of polyurethane or polyvinyl is bonded on an outer face of the main ply. A face ply 16 is bonded on top of the interlayer. The face ply is typically made of glass but may also be made of plastic. A heater layer or coating 15 may be applied to the inner surface of the face ply allowing for the heating of the face ply for purposes of defrosting, and the prevention of ice build up on, the face ply.

The face ply does not extend to the ends of the main ply. As such, an end portion 18 of the main ply is not covered by the face ply and interlayer. This end portion is mated to the frame 8. Typically, the end portion of the main ply is fastened to the window frame using fasteners 20, or may simply clamp an end portion of a windshield.

When the main ply is mounted to the frame, a gap 22 is left between an end of the frame and the ends of the face ply and interlayer. This gap allows for expansion and contraction of the window, i.e., the main ply, the face ply and interlayer. The gap is sealed with a sealant, typically a polysulfide sealant, which fills in the gap and extends over the face ply forming a hump seal 24 for preventing moisture from entering through the gap. Such moisture can cause delamination the window 10. Typically, the hump seal extends a distance 26 about half an inch over the face ply.

By extending over the outer surface of the face ply, the hump seal is exposed to the outer environment, and is consequently susceptible to erosion, cracking and lifting which results in the intrusion of moisture into the laminate structure of the window 10. As a result, hump seals have to be frequently inspected and repaired to prevent window delamination and/or heater layer failure.

Another problem with hump seals is that they are costly to manufacture in that they require a specific amount of sealant of a specific thickness to extend a specific amount over the face ply. As a result, the process of forming and controlling the hump seal is very labor intensive. The hump seal can also fail due to the delamination of the edge of the face ply abutting the hump seal. Additionally, major expenditure and effort is required to disassemble the window assembly for purposes of seal repair due to the bonding of the seal to the frame and plies.

A further problem with conventional aircraft window assemblies is that with time the face ply separates, i.e., delaminates, from at its edge from the interlayer 14, and/or the interlayer 14 and face ply delaminate from the main ply. This delamination also results in failure of the seal and is a frequent cause of aircraft window failures.

As such, a seal between the frame and face ply and/or window assembly incorporating such a system is desired that is more resistant to erosion, cracking and lifting and provides more resistance to face ply edge delamination and which is easier to manufacture and overhaul.

SUMMARY OF THE INVENTION

A window assembly incorporating a composite seal is provided. In one exemplary embodiment a window assembly is provided having a window frame, a window transparency first ply coupled to the frame and extending beyond the frame, and a window transparency second ply coupled to the first ply, the first ply extending beyond the frame and being spaced apart from the frame. A composite seal is sandwiched between the frame and the first ply and extending beyond the frame and over the second ply. The composite seal has a first sealing member, and a second member stiffer that the first sealing member which is coupled or attached to the first sealing member. The second member is sandwiched between the frame and the first sealing member and extends beyond the frame and over the first sealing member. In another exemplary embodiment, the first ply is fastened or otherwise coupled to the frame, and the frame applies pressure on the composite seal second member, and the second member applies pressure over the first sealing member extending over the second ply causing the second sealing member to compress over the second ply. In another exemplary embodiment, the first sealing member has a portion extending beyond the second member In an exemplary embodiment, the second member is made from Kevlar or other high modulus material. In another exemplary embodiment, the composite seal prevents the portion of the second ply over which the composite seal extends from delaminating relative to the first ply.

In yet another exemplary embodiment, a window assembly is provided having a window frame, a window transparency coupled to the frame, and a composite seal sandwiched between the frame and the transparency. In the exemplary embodiment, the composite seal includes a first sealing member, and a second member coupled to the first sealing member. The second member is stiffer than the first sealing member, and has a stiffness sufficient to transfer a force applied at first location on the second member to a second location on the first sealing member spaced apart from the first location along a direction transverse to the load application direction. In another exemplary embodiment, the second member includes a fibrous material.

With any of the aforementioned exemplary embodiments, the sealing member may be made from an elastomeric material, e.g., an elastomer.

DETAILED DESCRIPTION

Figure 1:
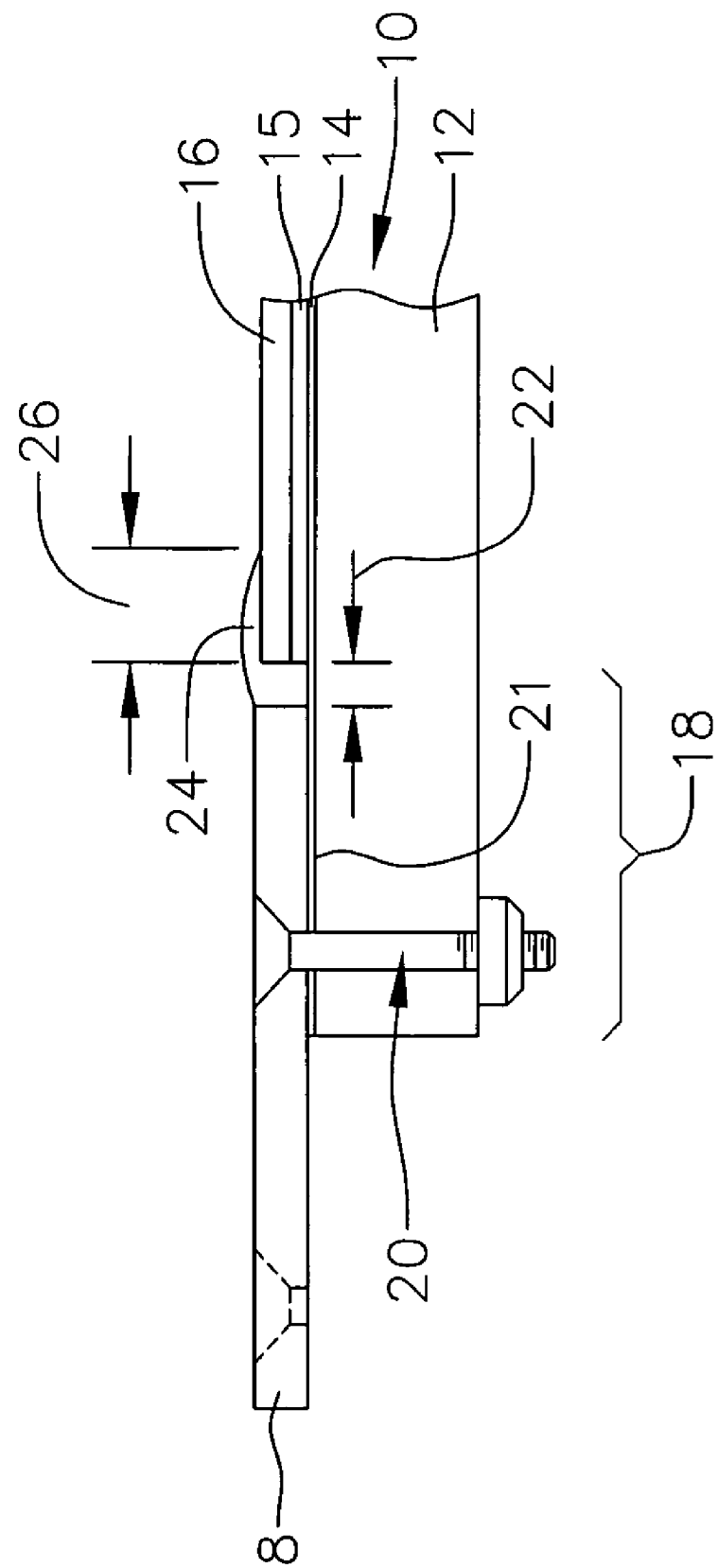
FIG. 1 is a cross-sectional view of a conventional window assembly.
Figure 2:
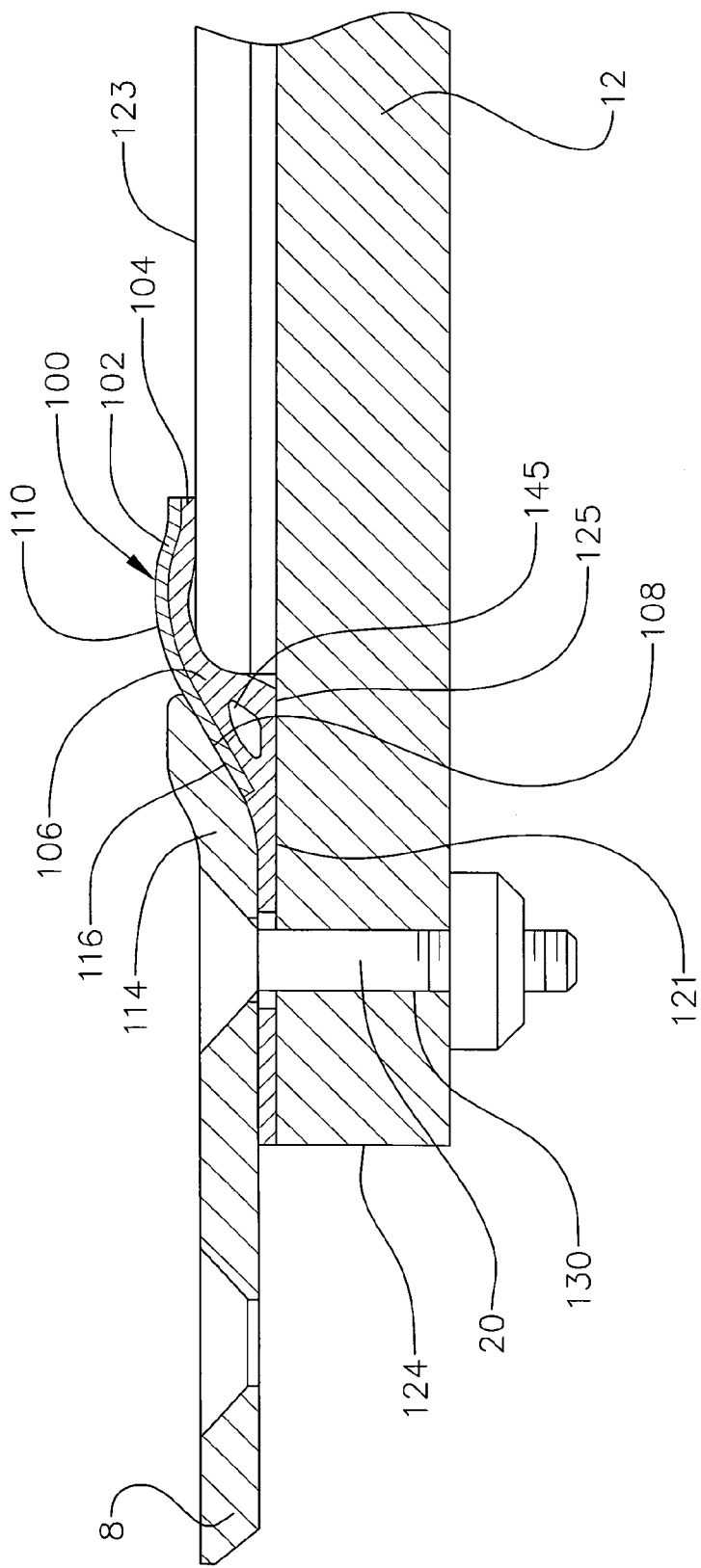
FIG. 2 is a cross-sectional view of an exemplary embodiment window assembly incorporating an exemplary embodiment composite seal of the present invention.

In an exemplary embodiment, a composite seal 100 is provided having an outer portion 102 defining an outer surface and an inner portion 104 forming a sealing member and made from an elastomer 106 defining an inner surface, as for example shown in FIG. 2. The outer portion is stiffer than the inner portion. In an exemplary embodiment, the outer portion is made from a composite material such as Kevlar or other high modulus material. In other exemplary embodiments, the outer portion may be made from various fiberglass materials or metals. The elastomer is bonded onto the composite surface. In an exemplary embodiment, the outer portion is formed and is placed in a mold. An elastomer material, which in the exemplary embodiment is a polyurethane material, is placed in the mold and allowed to cure such that it bonds with the outer portion material.

It should be noted that the words "inner" and "outer" as used herein are relative terms and are used for illustrative purposes to described the relative position of different members or structures. These terms should not be construed to describe the exact positions of such member or structures.

Figure 3:
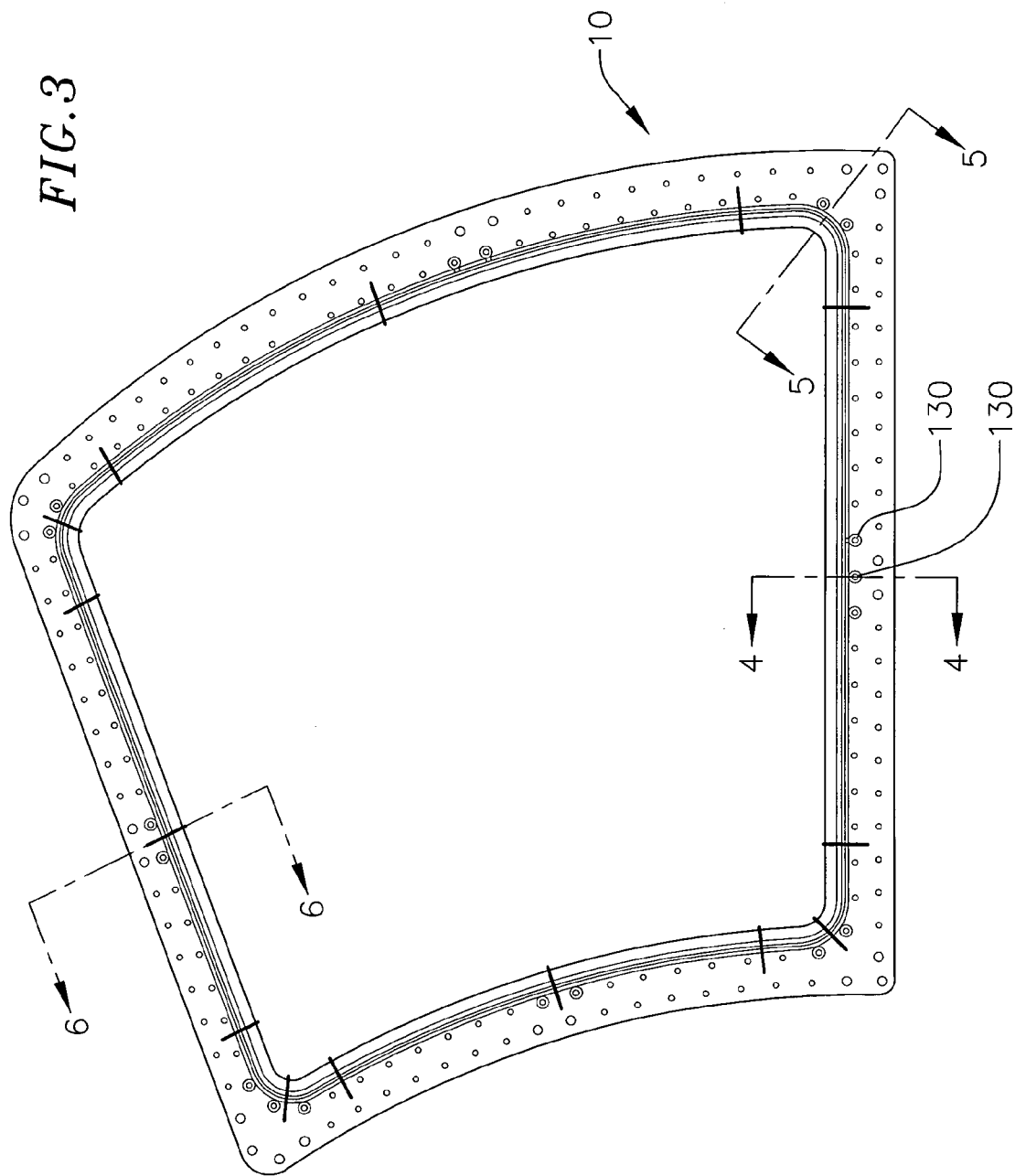
FIG. 3 is a top view of an exemplary embodiment window assembly incorporating an exemplary embodiment composite seal of the present invention.

Each of the inner and outer portions may be made as single structures such that together they form a single composite seal for sealing an entire window assembly 10 as for example the window assembly 10, shown in FIG. 3. In alternate exemplary embodiments, either or both the inner and outer portions may be made in segments.

In the exemplary embodiment shown in FIG. 2, the outer portion has a relatively flat section 108 from which extends a curved section 110. The end portion 114 of the frame 8 is angled defining an inner surface 116 for mating with the relatively flat section 108 of the composite seal outer portion. In the exemplary embodiment, the inner surface 116 of the frame is complementary to the outer surface of the flat section 108 of the outer portion of the composite seal. In an alternate exemplary embodiment, not shown, the end portion 114 of the frame is not angled but has a stepped or an angled inner surface 116 for mating with the flat section of the composite seal outer portion.

Figure 4:
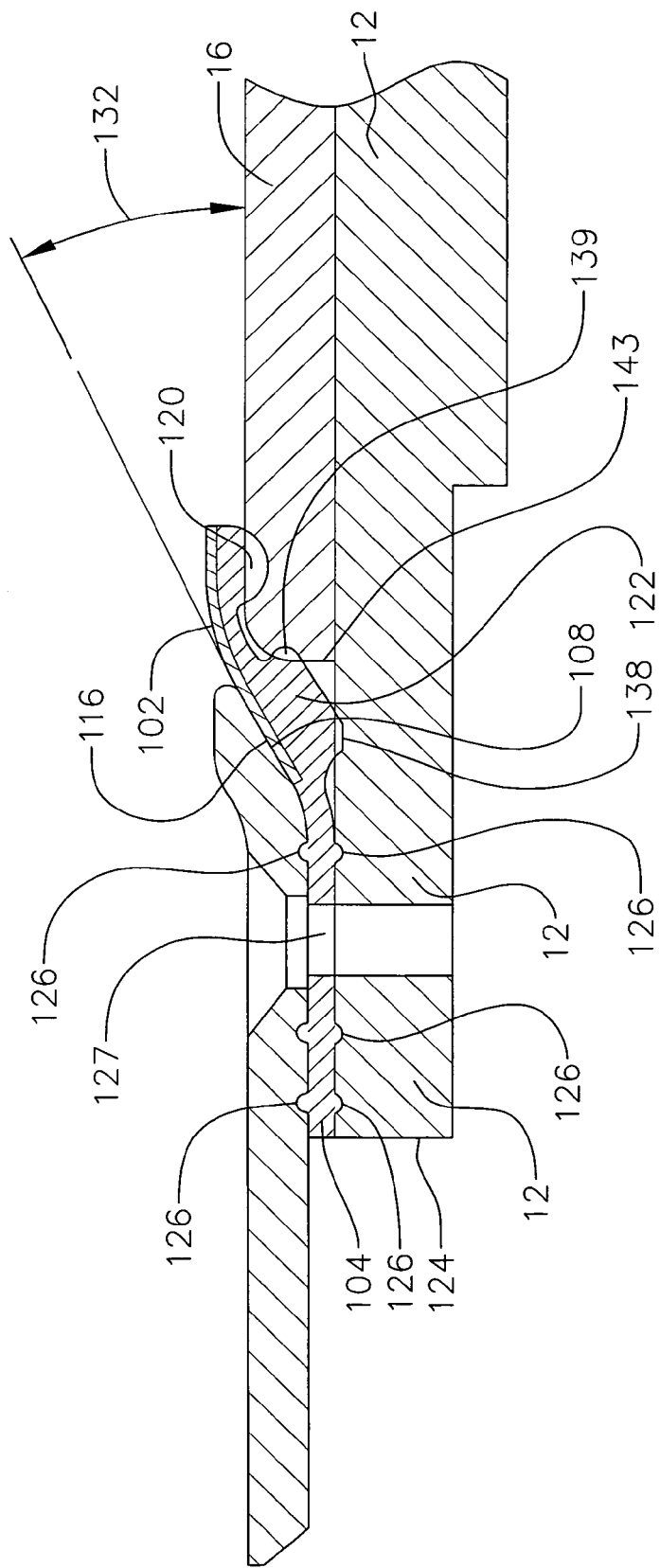
FIG. 4 is a cross-sectional view of the window assembly shown in FIG. 3 taking along arrows 4—4.

In the exemplary embodiment shown in FIG. 4, the elastomer 106 defines a bulb 120 at first end beneath the composite seal curved outer portion. An elastomeric protrusion 122 extends from the elastomer spaced apart from the bulb. When mounted on the window assembly, the protrusion is designed to interface with the main ply 12 and the face ply 16. In the exemplary embodiment shown in FIG. 4, one edge 138 of the protrusion interfaces with the main ply and another edge 139 interfaces with the edge 143 of the face ply. In a certain applications, a shim 121 (shown in FIG. 2) is used to control tolerances on the distance between the outer surface 123 of the face ply and the surface 125 of the main ply interfacing with the composite seal. The elastomer may extend beyond the composite seal outer portion, and has sufficient length such that the elastomer end distal from the bulb extends to an end 124 of the main ply, as for example shown in FIGS. 2 and 4. Protrusions or nibs 126 may extend from one surface or from opposite surfaces of the portion of the elastomer extending beyond the composite seal outer portion 102 as for example shown in FIG. 4. The nibs improve the sealing integrity between the composite seal inner elastomer portion and the opposite sealing surface, e.g., the main ply and/or the frame. In the exemplary embodiment, shown in FIG. 4, the nibs are integrally formed on either side of the openings 127 formed through the elastomer which are used to accommodate the fasteners 20 and on opposite surfaces of the elastomer for improving the static sealing integrity between opposing sealing surfaces.

Figure 5:
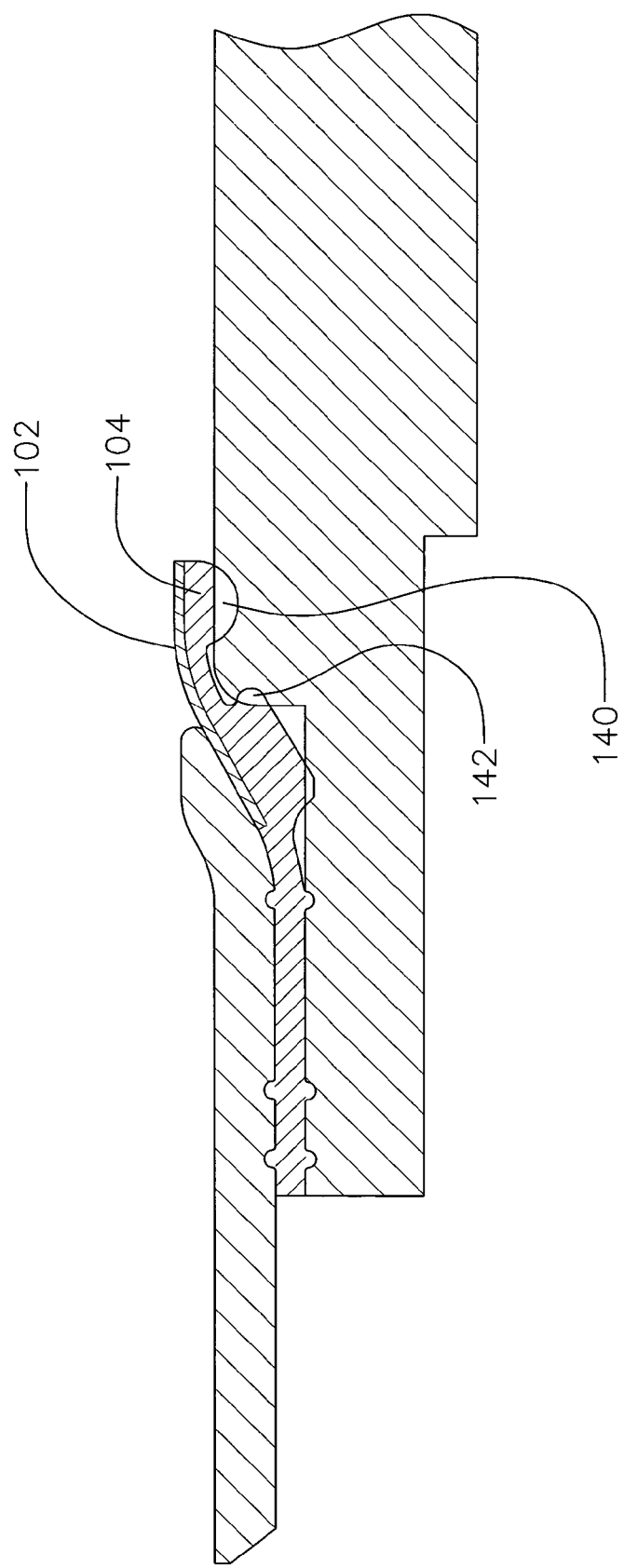
FIG. 5 is a cross-sectional view of the window assembly shown in FIG. 3 taken along arrows 5—5.
Figure 6:
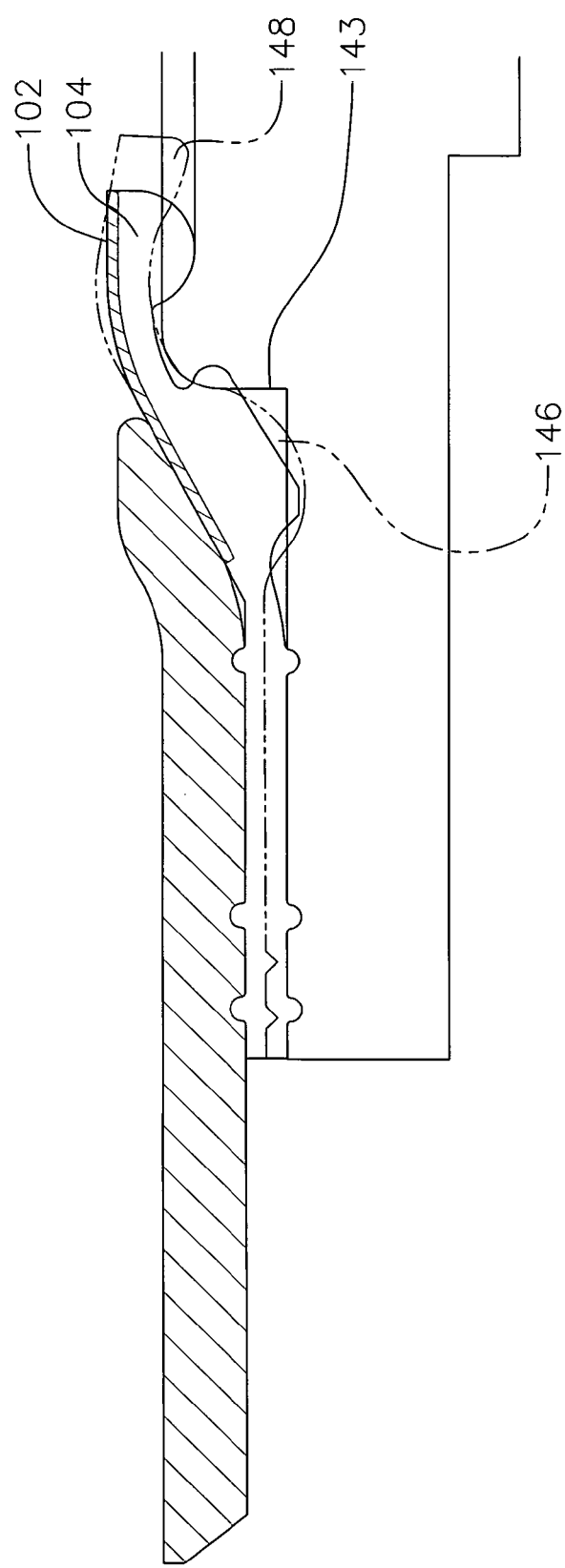
FIG. 6 is a cross-sectional view of the window assembly shown in FIG. 3 taking along arrows 6—6.

It should be noted that FIGS. 4, 5, and 6 are cross-sectional views taken along arrows 4—4, 5—5, and 6—6 in FIG. 3, respectively. It should also be noted that the elastomer 104 is depicted in FIGS. 4, 5, and 6 with the portions of the elastomer that are compressed, as for example portions 140 and 142 in FIG. 5, as overlapping the window assembly. In this regard, an illustration of the amount of elastomer that is compressed is provided by these Figures.

The composite seal is placed between the main ply and the frame and extends over the face ply as for example shown in FIGS. 2 and 4. In an exemplary embodiment, the composite seal is formed with the appropriate openings 127 to allow penetration by any of the fasteners 20 which are used to fasten the main ply to the frame. In the exemplary embodiment, the composite seal is positioned over the main ply such that the bulb 120 of the composite seal elastomer portion extends over the face ply and the protrusion 122 abuts against the main ply and an edge of the face ply. The frame is mounted over the composite seal such that the inner surface 116 of the frame end portion mates with the flat section 108 of the outer portion of the composite seal.

As the frame and main ply are coupled together, for example, as the fasteners 20, in the case where fasteners are used, are tightened, they cause the frame and main ply to come together causing the inner surface 116 of the frame to exert a force on the outer portion of the composite seal. As the frame and main ply come together, a load is applied from the frame on the outer portion of the composite seal, causing the outer portion of the composite seal, which is stiffer than the inner elastomer portion, to deflect and exert a force against the elastomer causing the protrusion 122 to compress and form a seal against main ply and the edge of the face ply and the bulb to compress and form a seal over the outer surface of the face ply. More, specifically in the exemplary embodiment, an edge 138 of the protrusion forms a seal against the main ply and an edge 139 of the protrusion form a seal against the edge of the face ply as for example shown in FIG. 4. As can be seen by being stiffer, the outer portion transfers the load applied by the frame from the point of application of the load to locations away from the point of application. In addition, the nibs 126 formed on the portion of the elastomer extending beyond the outer portion of the composite seal are compressed forming a seal between the frame and the main ply.

The force applied by the frame against the outer portion of the composite seal may be controlled by varying the angle 132 of the inner surface 116 of the frame end portion, or the flat section 108 of the composite seal inner portion, relative to a window ply plane, such as the outer surface of the face ply. The force applied may also be controlled by changing the stiffness or hardness of the outer portion of the composite seal or the stiffness or hardness of the inner portion. In the exemplary embodiment shown, the angle 132 between the inner surface 116 of the frame end portion relative to the face ply interfacing with the elastomer bulb, is about 29°.

By applying a force against the elastomer, the outer portion of the composite seal also provides a force such as a clamping force for preventing the prying action of the face ply when the main ply is deflected outward toward the face ply due to aircraft pressurization and thus, prevents the delamination of the end of face ply from the interlayer and/or the delamination of the end of the face ply and interlayer from the main ply. Moreover, the outer portion of the composite seal prevents the inner elastomer portion from lifting away from the face ply as well as protects the inner elastomer portion from exposure to the outside elements.

In the exemplary embodiment shown in FIG. 4, each nib has a thickness of about 0.03 of an inch. Prior to compression, the composite seal extends about 0.37 inch over the face ply as measured from the edge 143 of the face ply. In the exemplary embodiment the outer portion of the composite ply has a thickness of about 0.06 inch. Furthermore, in the exemplary embodiment, the thickness of the bulb portion that gets compressed is about 0.06 inch.

In alternate embodiments, the elastomeric protrusion may be made hollow, i.e., it may have a hollow space 145, so as to have more flexibility, as for example shown in FIG. 2. In alternate exemplary embodiments, the elastomer may have a more rounded protrusion 146 for sealing against the main ply and the edge 143 of the face ply and/or may have a more pointed bulb portion 148 as for example shown in dashed lines in FIG. 6. The overall composite seal section extending over the face ply may be made longer as for example shown in dashed lines in FIG. 6. In further alternate exemplary embodiments, the inner and outer portions of the composite seal may be co-molded together, may be separately molded and then bonded to each other, or may not be bonded to each other. In other exemplary embodiments, instead of an elastomer other resilient materials may be used to form the composite seal inner portion such that the composite seal inner portion is not as stiff as the composite seal outer portion.

Furthermore, a window assembly incorporating the composite seal is easier to disassemble than a window assembly incorporating a conventional seal, as the outer portion of the seal does not bond to the frame.

Although specific exemplary embodiments have been disclosed herein, it is expected that persons skilled in the art may design or derive alternative composite seals and/or window assemblies incorporating composite seals that are within the scope of the following claims either literally or under the doctrine of equivalents.

What is claimed is:

1. A window assembly comprising:
    a window frame;
    a window transparency first ply coupled to the frame and extending beyond the frame;
        a window transparency second ply coupled to the first ply, the second ply having a second surface opposite a first surface, wherein the first surface faces the first ply, and wherein the second ply extends beyond the frame and is spaced apart from the frame; and
        a composite seal sandwiched between the frame and the first ply and extending beyond the frame and over the second ply second surface, the composite seal comprising,
            a first sealing member, and
            a second member coupled to the first sealing member, wherein the second member is stiffer than the first sealing member, and wherein the second member is sandwiched between the frame and the first sealing member and extending beyond the frame and over the first sealing member.

2. An assembly as recited in claim 1 wherein the first sealing member is bonded to the second member.

3. An assembly as recited in claim 2 wherein the first ply is fastened to the frame, wherein when fastened to the frame, the frame applies pressure on the second member, and wherein the second member applies pressure over the first sealing member extending over the second ply causing the second sealing member to compress over the second ply.

4. An assembly as recited in claim 1 wherein when coupled to the frame, the frame applies pressure on the second member, and wherein the second member applies pressure over the first sealing member extending over the second ply causing the second sealing member to compress over the second ply.

5. An assembly as recited in claim 4 wherein an end portion of the frame from which the composite seal extends is bent away from the first ply.

6. An assembly as recited in claim 4 wherein the second member of the composite seal comprises a fibrous composite material.

7. An assembly as recited in claim 4 wherein the second member of the composite seal comprises Kevlar.

8. An assembly as recited in claim 4 wherein the second member comprises a metal.

9. An assembly as recited in claim 4 wherein the composite seal first sealing member extending over the second ply comprises a bulb portion which is compressed against the second ply when the first ply is coupled to the frame.

10. An assembly as recited in claim 9 wherein the composite seal first sealing member comprises a protrusion spaced apart from the bulb, said protrusion being sandwiched between an edge of the second ply, the first ply and the frame.

11. An assembly as recited in claim 10 further comprising an opening formed through the protrusion to enhance the protrusions flexibility.

12. An assembly as recited in claim 10 wherein the composite seal first sealing member comprises a portion extending beyond the second ply and sandwiched between the frame and first ply.

13. An assembly as recited in claim 12 wherein said composite seal first sealing member portion extending beyond the second member and sandwiched between the frame and the first ply comprises nibs extending from opposite surfaces of said member portion, wherein when the frame is coupled to the first ply, the nibs from one of said member portion surface are compressed against the frame, and the nibs extending from the opposite surface of said member portion are compressed against the first ply.

14. An assembly as recited in claim 4 wherein the composite seal first sealing member comprises a protrusion, said protrusion being sandwiched between an edge of the second ply, the first ply and the frame.

15. An assembly as recited in claim 4 wherein the composite seal first sealing member comprises a portion extending beyond the second member sandwiched between the frame and first ply.

16. An assembly as recited in claim 15 wherein said composite seal first sealing member portion extending beyond the second member and sandwiched between the frame and the first ply comprises nibs extending from opposite surfaces of said member portion, wherein when the frame is coupled to the first ply, the nibs from one of said member portion surface are compressed against the frame, and the nibs extending from the opposite surface of said member portion are compressed against the first ply.

17. An assembly as recited in claim 4 wherein the window transparency first ply is a window transparency main ply and wherein the window transparency second ply is a window transparency face ply.

18. An assembly as recited in claim 4 wherein the composite seal prevents a portion of the second ply over which the composite seal extends from delaminating relative to the first ply.

19. An assembly as recited in claim 1 wherein the first sealing member comprise a first portion, wherein said first portion is attached to the second member, and wherein the first member comprises a second portion extending transversely from the first portion.

20. An assembly as recited in claim 1 wherein the first sealing member comprises an elastomeric material.

21. A window assembly comprising:
   a window frame;
   a window transparency coupled to the frame, the transparency having an outer surface opposite an inner surface; and
   a composite seal sandwiched between the frame and the transparency and extending over the transparency outer surface, the composite seal comprising,
      a first sealing member, and
      a second member coupled to the first sealing member, wherein the second member is stiffer than the first sealing member, said second member having a stiffness sufficient to transfer a force applied at first location on the second member to a second location on the first sealing member spaced apart from the first location along a direction transverse to the load application direction.

22. A window assembly as recited in claim 21 wherein the second member comprises a fibrous material.

23. A window assembly as recited in claim 21 wherein the first sealing member comprises an elastomeric material.

24. A window assembly comprising:
   a window frame;
   a window transparency first ply coupled to the frame and extending beyond the frame;
   a window transparency second ply coupled to the first ply, the second ply extending beyond the frame and being spaced apart from the frame; and
   a composite seal sandwiched between the frame and the first ply and extending beyond the frame and over the second ply, the composite seal comprising,
      a first sealing member, and
      a second member coupled to the first sealing member, wherein the second member is stiffer than the first sealing member, and wherein the second member is sandwiched between the frame and the first sealing member and extending beyond the frame and over the first sealing member, wherein when coupled to the frame, the frame applies pressure on the second member, and wherein the second member applies pressure over the first sealing member extending over the second ply causing the second sealing member to compress over the second ply, wherein the composite seal first sealing member extending over the second ply comprises a bulb portion which is compressed against the second ply when the first ply is coupled to the frame, wherein the composite seal first sealing member comprises a protrusion spaced apart from the bulb, said protrusion being sandwiched between an edge of the second ply, the first ply and the frame, wherein the composite seal first sealing member comprises a portion extending beyond the second ply and sandwiched between the frame and first ply, wherein said composite seal first sealing member portion extending beyond the second member and sandwiched between the frame and the first ply comprises nibs extending from opposite surfaces of said member portion, and wherein when the frame is coupled to the first ply, the nibs from one of said member portion surface are compressed against the frame, and the nibs extending from the opposite surface of said member portion are compressed against the first ply.

25. A window assembly comprising:
   a window frame;
   a window transparency first ply coupled to the frame and extending beyond the frame;
   a window transparency second ply coupled to the first ply, the second ply extending beyond the frame and being spaced apart from the frame; and
   a composite seal sandwiched between the frame and the first ply and extending beyond the frame and over the second ply, the composite seal comprising,
      a first sealing member, and
      a second member coupled to the first sealing member, wherein the second member is stiffer than the first sealing member, and wherein the second member is sandwiched between the frame and the first sealing member and extending beyond the frame and over the first sealing member, wherein when coupled to the frame, the frame applies pressure on the second member, and wherein the second member applies pressure over the first sealing member extending over the second ply causing the second sealing member to compress over the second ply, wherein the composite seal first sealing member comprises a portion extending beyond the second member sandwiched between the frame and first ply, wherein said composite seal first sealing member portion extending beyond the second member and sandwiched between the frame and the first ply comprises nibs extending from opposite surfaces of said member portion, and wherein when the frame is coupled to the first ply, the nibs from one of said member portion surface are compressed against the frame, and the nibs extending from the opposite surface of said member portion are compressed against the first ply.

* * * * *

UNITED STATES PATENT AND TRADEMARK OFFICE
CERTIFICATE OF CORRECTION

PATENT NO. : 7,118,070 B2
APPLICATION NO. : 10/898403
DATED : October 10, 2006
INVENTOR(S) : Abrams et al.

It is certified that error appears in the above-identified patent and that said Letters Patent is hereby corrected as shown below:

| | |
|---|---|
| Column 5, line 64, Claim 1 | Delete "extending", Insert --extends-- |
| Column 6, line 6, Claim 3 | Delete "second", Insert --first-- |
| Column 6, line 11, Claim 4 | Delete "second", Insert --first-- |
| Column 6, line 34, Claim 11 | Delete "protrusions", Insert --protrusion's-- |
| Column 6, line 37, Claim 12 | Delete "ply", Insert --member-- |
| Column 6, line 45, Claim 13 | Delete "surface", Insert --surfaces-- |
| Column 7, line 10, Claim 19 | Delete "comprise", Insert --comprises-- |
| Column 7, line 52, Claim 24 | Delete "extending", Insert --extends-- |
| Column 7, line 57, Claim 24 | Delete "second", Insert --first-- |
| Column 8, line 10, Claim 24 | Delete "ply", Insert --member-- |

UNITED STATES PATENT AND TRADEMARK OFFICE
CERTIFICATE OF CORRECTION

PATENT NO. : 7,118,070 B2
APPLICATION NO. : 10/898403
DATED : October 10, 2006
INVENTOR(S) : Abrams et al.

It is certified that error appears in the above-identified patent and that said Letters Patent is hereby corrected as shown below:

Column 8, line 41, Claim 25   Delete "second",
                              Insert --first--

Signed and Sealed this

Twenty-fourth Day of April, 2007

JON W. DUDAS
*Director of the United States Patent and Trademark Office*